E. MOTZ.

Improvement in Expansion Pivot for Wheels of Sewing and other Machines.

No. 123,637. Patented Feb. 13, 1872.

Witnesses:
Gustave Dieterich
Geo. W. Mabee

Inventor:
E. Motz
PER
Attorneys.

UNITED STATES PATENT OFFICE.

EMANUEL MOTZ, OF WOODWARD, PENNSYLVANIA.

IMPROVEMENT IN EXPANSION PIVOTS FOR WHEELS OF SEWING AND OTHER MACHINES.

Specification forming part of Letters Patent No. 123,637, dated February 13, 1872.

Specification describing a new and Improved Expansion Pivot, invented by EMANUEL MOTZ, of Woodward, in the county of Centre and State of Pennsylvania.

Figure 1:
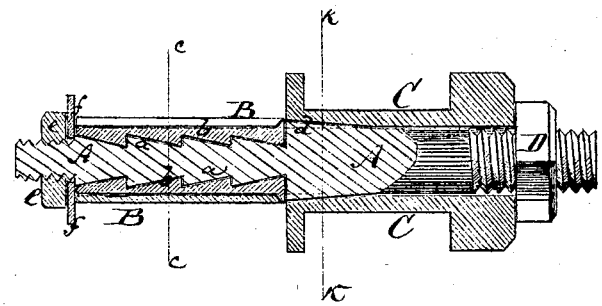
Figure 2:
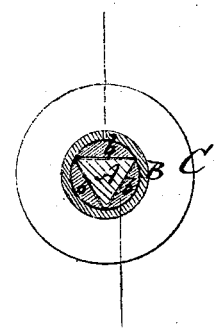
Figure 3:
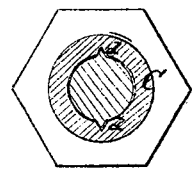
Figure 4:

Figure 1 is a longitudinal section of my improved expansion pivot. Figs. 2 and 3 are transverse sections of the same on the lines $c\ c$ and $k\ k$, respectively. Fig. 4 is a detail perspective view of one of the ratchet-keys.

Similar letters of reference indicate corresponding parts.

This invention has for its object to provide against the wear of pivots or arbors in machinery, or of the wheels running thereon; and consists in making the same expansible by means of longitudinally-adjustable ratchet-keys placed around the pivot and within a split ring.

The invention is particularly useful for sewing-machines and similar devices, as it counteracts the wearing of bearings and eyes of wheels, and consequent noise, rattle, and increase of friction.

A, in the drawing, represents the pivot-pin, made prismatic—three or more sided—at that part where it receives the greatest strain, while the machinery to which it pertains is in motion. The straight sides $a\ a$ of the prismatic portion are toothed, ratchet fashion, and upon them are placed toothed plates $b\ b$, whose teeth correspond with those of $a$. The outer sides of the plates $b\ b$ are rounded, so that when applied to the pin they make it again of cylindrical form, as shown in Fig. 2. A split spring ring, B, is placed around the plates $b\ b$. C is a sleeve, supporting the pin A, and placed around the round portion of the pin A, and made adjustable longitudinally by means of a nut, D, that is screwed upon the pin A. Projecting ribs $d$ on A fit into grooves within the sleeve C, as in Fig. 3, and prevent the same from turning. The sleeve C bears against the inner ends of the plates $b$; their outer ends do not quite reach a nut, $e$, or washer $f$, held by $e$, that bears against the split ring B and holds it in place.

When the pivot is applied, the spring ring B furnishes the bearing surface. When the pivot wears smaller, or the eye of the wheel larger, the nut D is turned against the sleeve C, the nut $e$ being at the same time unscrewed in an equal degree. The nut D crowds the sleeve C toward $e$, and thereby moves the ratchet-plates lengthwise, causing them to ride upon the higher parts of the teeth on $a$, and thereby to expand the ring B.

Having thus described my invention, I claim as new, and desire to secure by Letters Patent—

The pin A, having the toothed section $a$, and combined with the ratchet-plates $b$, nut D, sleeve C, spring ring B, and nut $e$, all arranged as set forth.

EMANUEL MOTZ.

Witnesses:
JNO. NORRIS,
A. WALTER.